(12) United States Patent
Kulkarni et al.

(10) Patent No.: US 11,499,537 B2
(45) Date of Patent: Nov. 15, 2022

(54) CLOSED LOOP TORQUE COMPENSATION FOR COMPRESSOR APPLICATIONS

(71) Applicant: Microchip Technology Incorporated, Chandler, AZ (US)

(72) Inventors: Prasad Kulkarni, Bengaluru (IN); Debraj Deb, Bengaluru (IN); Ramesh Kankanala, Bengaluru (IN)

(73) Assignee: Microchip Technology Incorporated, Chandler, AZ (US)

( * ) Notice: Subject to any disclaimer, the term of this patent is extended or adjusted under 35 U.S.C. 154(b) by 327 days.

(21) Appl. No.: 15/844,569

(22) Filed: Dec. 17, 2017

(65) Prior Publication Data

US 2019/0186480 A1 Jun. 20, 2019

(51) Int. Cl.
| | |
|---|---|
| F04B 39/00 | (2006.01) |
| H02P 21/04 | (2006.01) |
| H02P 21/05 | (2006.01) |
| H02P 21/22 | (2016.01) |
| H02P 21/06 | (2016.01) |
| F04C 2/00 | (2006.01) |
| H02P 21/18 | (2016.01) |
| F04B 35/04 | (2006.01) |

(52) U.S. Cl.
CPC .......... *F04B 39/0044* (2013.01); *F04B 35/04* (2013.01); *F04C 2/00* (2013.01); *H02P 21/04* (2013.01); *H02P 21/05* (2013.01); *H02P 21/06* (2013.01); *H02P 21/18* (2016.02); *H02P 21/22* (2016.02); *F04B 2203/0202* (2013.01); *F04B 2203/0209* (2013.01); *F04B 2207/03* (2013.01)

(58) Field of Classification Search
CPC .......... H02P 21/18; H02P 21/22; H02P 21/04; H02P 21/05; H02P 21/06; F04B 39/0044; F04B 2203/0202; F04B 2203/0209; F04B 2207/03; F04C 2/00

USPC .................................................... 318/400.15
See application file for complete search history.

(56) References Cited

U.S. PATENT DOCUMENTS

| | | | | |
|---|---|---|---|---|
| 5,990,645 A | * | 11/1999 | Nakamura | G05D 19/02 318/128 |
| 7,952,308 B2 | * | 5/2011 | Schulz | H02P 6/10 318/434 |

(Continued)

FOREIGN PATENT DOCUMENTS

| | | | | |
|---|---|---|---|---|
| EP | 2889999 A1 | 7/2015 | | H02P 21/14 |
| EP | 2191564 B1 | 10/2015 | | H02P 21/14 |

OTHER PUBLICATIONS

International Search Report and Written Opinion, Application No. PCT/US2018/065907, 15 pages, dated Mar. 19, 2019.

*Primary Examiner* — Bickey Dhakal
*Assistant Examiner* — Devon A Joseph
(74) *Attorney, Agent, or Firm* — Slayden Grubert Beard PLLC

(57) ABSTRACT

Embodiments of the present disclosure include a motor controller with a processor and a machine readable medium. The medium includes instructions that, when loaded and executed by the processor, cause the processor to receive an estimated or sensed speed of a motor, extract a mechanical frequency component from the estimated or sensed speed, transform the mechanical frequency into direct quadrature (DQ) domain at the mechanical frequency, control the mechanical frequency to zero, and generate a dampening signal for torque based upon the controlled mechanical frequency.

22 Claims, 6 Drawing Sheets

(56) References Cited

U.S. PATENT DOCUMENTS

| | | | | |
|---|---|---|---|---|
| 8,242,719 B2* | 8/2012 | Kubal | ............... | H02P 1/04 |
| | | | | 318/105 |
| 8,704,469 B2* | 4/2014 | Tadano | ............ | H02P 21/05 |
| | | | | 318/431 |
| 9,008,910 B2* | 4/2015 | Cottard | .......... | B62D 5/0463 |
| | | | | 701/41 |
| 9,160,260 B1* | 10/2015 | Keas | ............. | H02P 29/50 |
| 9,912,266 B2* | 3/2018 | Marvin | ............ | H02P 6/14 |
| 10,715,075 B2* | 7/2020 | Fujiwara | ......... | H02P 29/00 |
| 2003/0123989 A1* | 7/2003 | Holden | ............ | F04B 41/06 |
| | | | | 417/2 |
| 2005/0129243 A1* | 6/2005 | Bousis | ............ | H04L 9/0637 |
| | | | | 380/277 |
| 2006/0066111 A1* | 3/2006 | Suryanarayanan | ... | F03D 7/0272 |
| | | | | 290/44 |
| 2008/0129243 A1* | 6/2008 | Nashiki | ............ | H02K 3/28 |
| | | | | 318/701 |
| 2011/0175556 A1* | 7/2011 | Tobari | ............ | H02P 21/05 |
| | | | | 318/400.23 |
| 2011/0221378 A1* | 9/2011 | Tazawa | ........... | H02P 29/50 |
| | | | | 318/619 |
| 2012/0305821 A1* | 12/2012 | Kubo | ............ | E02F 9/2004 |
| | | | | 251/236 |
| 2015/0084575 A1* | 3/2015 | Magee | ............ | H02P 6/181 |
| | | | | 318/768 |
| 2015/0185095 A1* | 7/2015 | Wu | ............... | H02P 21/20 |
| | | | | 73/862.08 |
| 2017/0277130 A1* | 9/2017 | Saito | ............ | G04C 3/143 |
| 2019/0199267 A1* | 6/2019 | Fujiwara | ........ | H02P 23/14 |
| 2019/0207549 A1* | 7/2019 | Fujiwara | ........ | H02P 6/10 |

* cited by examiner

| SPEED (RPM) | ON TORQUE COMPENSATION (m/s^2) | TORQUE COMPENSATION (m/s^2) | REDUCTION IN VIBRATION (%) |
|---|---|---|---|
| 500 | 1.39E-03 | 9.54E-05 | 93.14 |
| 1000 | 7.22E-03 | 2.92E-03 | 59.59 |
| 1500 | 1.50E-02 | 3.65E-02 | -142.35 |
| 2000 | 8.48E-03 | 6.85E-03 | 19.19 |
| 2500 | 2.19E-02 | 2.31E-02 | -5.30 |
| 3000 | 7.44E-02 | 2.89E-02 | 61.15 |

RESONANCE { (1500, 2000)

FIG. 5

CLOSED LOOP TORQUE COMPENSATION FOR COMPRESSOR APPLICATIONS

FIELD OF THE INVENTION

The present disclosure relates to compressors and, more particularly, to closed loop torque compensation for compressor applications.

BACKGROUND

Motor-driven compressors are used in a variety of applications, such as cooling and refrigeration. Compressors make use of a variety of motors therein, including with permanent-magnet synchronous motor (PMSM), or interior permanent-magnet synchronous motor (IPMSM) motors and variants thereof. Duty cycles of motors in compressors may typically be 45%. A typical duty cycle of a compressor in a low speed mode may be 70%, and the effective low speed duty cycle of such a compressor may be 31%. For example, in a given hour, the compressor may be turned on for about 27 minutes (corresponding to 45% of 60 minutes). Out of these 27 minutes, the compressor may be running at low speeds for about 19 minutes (corresponding to 70% of 27 minutes), making the effective duty cycle for low speed compressor as 19 minutes in an hour, or 31%.

Field-oriented control may use a torque component, aligned with the q coordinate, and a flux component, aligned with the d coordinate. As used herein, the terms field-oriented control and vector control may be used interchangeably. Control of torque made through projections in the d, q coordinate system can be translated to the a, b, c coordinate system, and vice-versa. Thus, control of torque can be made through control of the torque component of the stator current or voltage vector. Voltages, currents, and flux of motors may be analyzed in terms of complex space vectors. Stator current space vector and its component in (a,b,c) where (a,b,c) are the three phase system axes. This space vector may include a three-phase sinusoidal system. Values expressed in this space vector may be transformed to the (d, q) system in two steps: from the (a,b,c) coordinates to an $(\alpha,\beta)$ set (also known as the Clarke transformation) which outputs a two co-ordinate time variant system. Then, the $(\alpha,\beta)$ set may be transformed to the (d,q) set (also known as the Park transformation) which outputs a two co-ordinate time invariant system. Vector control implementations may assume ungrounded motor with balanced three-phase currents such that only two motor current phases need to be sensed. In vector control, an AC induction or synchronous motor is controlled under all operating conditions like a separately excited DC motor. That is, the AC motor behaves like a DC motor in which the field flux linkage and armature flux linkage created by the respective field and armature (or torque component) currents are orthogonally aligned such that, when torque is controlled, the field flux linkage is not affected, hence enabling dynamic torque response. Vector control may accordingly generate a three-phase PWM motor voltage output derived from a complex voltage vector to control a complex current vector derived from motor's three-phase stator current input through projections or rotations back and forth between the three-phase speed and time dependent system and these vectors' rotating reference-frame two-coordinate time invariant system.

SUMMARY

Embodiments of the present disclosure may include an article of manufacture. The article of manufacture includes a machine readable medium. The medium includes instructions that, when loaded and executed by a processor, cause the processor to receive an estimated or sensed speed of a motor, extract a mechanical frequency component from the estimated or sensed speed, transform the mechanical frequency into direct quadrature (DQ) domain at the mechanical frequency, control the mechanical frequency to zero, and generate a dampening signal for torque based upon the controlled mechanical frequency. In combination with any of the above embodiments, the processor may be further caused to generate the dampening signal by converting the controlled mechanical frequency at zero to DQ domain at an electrical frequency. In combination with any of the above embodiments, the processor may be further caused to feed the controlled mechanical frequency forward to a next iteration of control. In combination with any of the above embodiments, the processor may be further caused to feed forward the converted mechanical frequency at zero to DQ domain at an electrical frequency to a next iteration of control. In combination with any of the above embodiments, the processor may be further caused to extract the mechanical frequency component from the estimated or sensed speed by using a notch filter, a high-low pass filter, a block average filter, or a second-order generalized integrator. In combination with any of the above embodiments, the processor may be further caused to calculate compensation by performing a proportional-integrative (PI) Loop over an extracted ripple in the DQ Domain.

Embodiments of the present disclosure may include a motor controller. The motor controller may include a processor and any of the articles of manufacture above.

Embodiments of the present disclosure may include a compressor. The compressor may include a motor and any of the motor controllers above.

Embodiments of the present disclosure may include a system. The system may include a motor and any of the motor controllers above.

Embodiments of the present disclosure may include methods performed by any of the motor controllers, compressors, systems, or execution of instructions above. Embodiments of the present disclosure may include a method comprising receiving an estimated or sensed speed of the motor, extracting a mechanical frequency component from the estimated or sensed speed, transforming the mechanical frequency into DQ domain at the mechanical frequency, controlling the mechanical frequency to zero, and generating a dampening signal for torque based upon the controlled mechanical frequency. The method may further include generating the dampening signal by converting the controlled mechanical frequency at zero to DQ domain at an electrical frequency. The method may further include feeding forward the converted mechanical frequency at zero to DQ domain at an electrical frequency to a next iteration of control. The method may further include feeding the controlled mechanical frequency forward to a next iteration of control. The method may further include extracting the mechanical frequency component from the estimated or sensed speed by applying a suitable filter. The method may further include calculating compensation by performing a PI Loop over an extracted ripple in the DQ Domain

BRIEF DESCRIPTION OF THE DRAWINGS

FIGS. 5 and 6 illustrate results of performance of embodiments of the present disclosure when compared to the same embodiments wherein active torque compensation is not performed.

DETAILED DESCRIPTION

Figure 1:
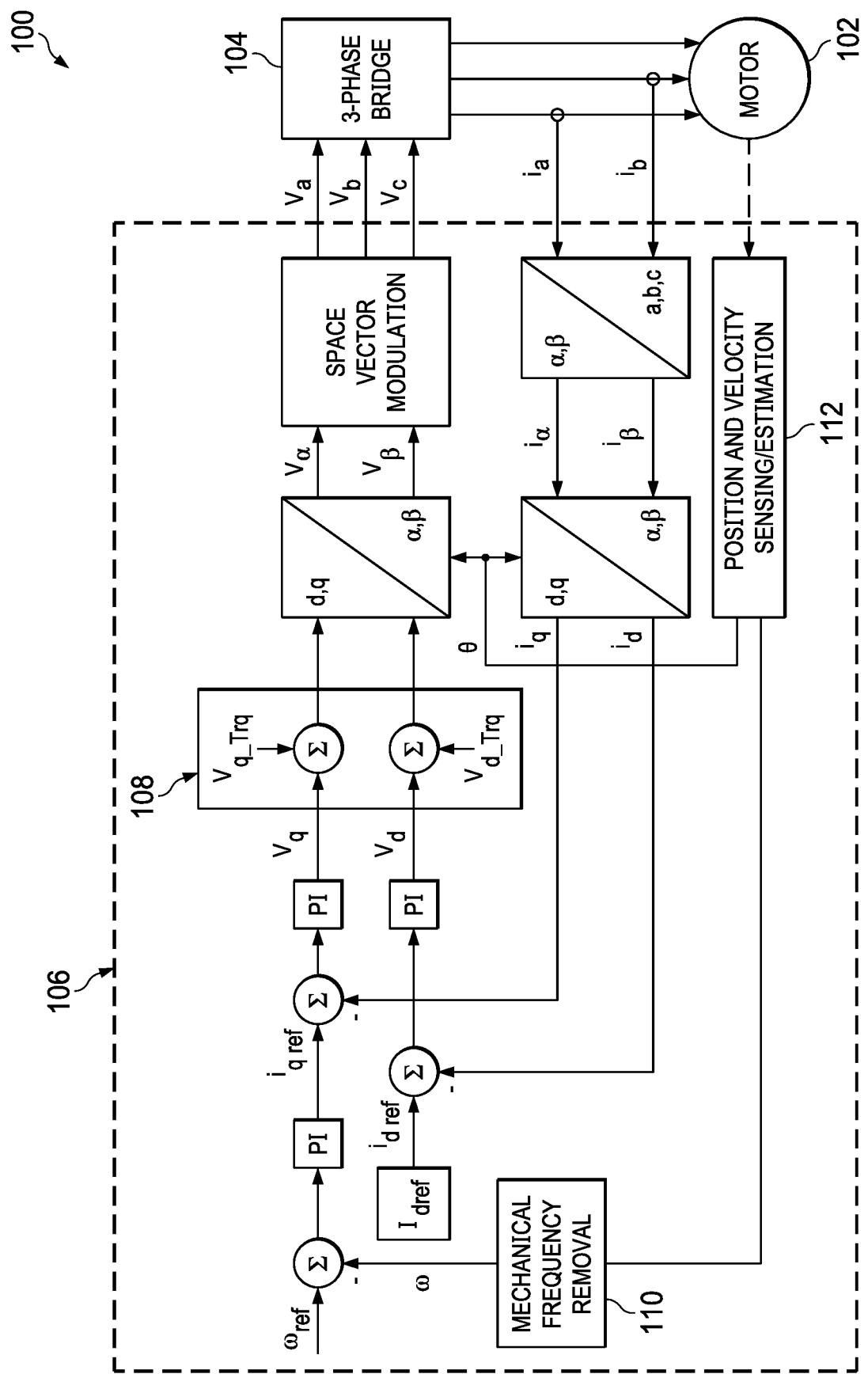
FIG. 1 is a block diagram of a system for field-oriented control (FOC) with torque compensation of a motor, according to embodiments of the present disclosure.

FIG. 1 is a block diagram of a system 100 for field-oriented control (FOC) of a motor, according to embodiments of the present disclosure. FOC control may be of a motor 102. Motor 102 may include, for example, a variable-speed motor. The variable-speed motor may be a three-phase electric motor. Motor 102 may include a PMSM or an IPMSM motor. Motor 102 may power, for example, a compressor.

System 100 may include a motor controller 106. Motor controller 106 may be configured to control the operation of motor 102. Motor controller 106 may be configured to control the operation of motor 102 by issuing control signals to a bridge 104. Bridge 104 may be implemented as, for example, a 3-phase bridge. Bridge 104 may be implemented in any suitable combination of analog and digital circuitry. Bridge 104 may be configured to receive three voltage signals, $V_a$, $V_b$, and $V_c$ as control signals. Bridge 104 may be configured to issue current signals $i_a$ and $i_b$ to motor 102. The current signals $i_a$ and $i_b$ may be fed back into motor controller 106.

Motor controller 106 may be implemented in any suitable manner, such as by analog circuitry, digital circuitry, instructions stored on a machine-readable medium for execution by a processor, or any suitable combination thereof. Motor controller 106 is illustrated as a logical block diagram of the operations that motor controller 106 may be configured to perform.

Motor controller 106 may control stator currents of motor 102 represented by a vector, such as voltage signals $V_a$, $V_b$, and $V_c$ as control signals. The FOC control performed by motor controller 106 may include projections to transform data and calculations between a two-coordinate time invariant system expressed in d, q (direct or differential and quadrature) coordinates and a three-phase time and speed dependent system expressed in a, b, and c coordinates.

For example, motor controller 106 may be configured to perform proportional-integrative (PI) control of signals to be issued to bridge 104 for control of motor 102. The outputs of motor controller 106—$V_a$, $V_b$, and $V_c$—may be expressed in a vector space.

A mechanical frequency reference, $\omega_{ref}$, may be passed into a comparator, differentiator, or other mechanism to determine a difference between the mechanical frequency reference and a measured or calculated mechanical frequency of motor 102. The mechanical frequency reference may come from a different microcontroller or a different part in firmware of the same microcontroller that operates motor controller 106. The range of values of the mechanical frequency reference may depend upon the compressor design and gas being used. The actual value depends upon various factors, such as the difference in set and actual temperature, ambient temperature, etc.

The result may be passed into PI control, which may issue the result as $i_{q-ref}$. This result may express the torque component of current in the DQ domain. An is-ref may be generated. This may be a flux component of current in DQ domain and may be generated by combining references from maximum torque per ampere (MTPA) routine and a flux weakening block (FW). The lesser of the two may be set as the $i_{d-ref}$.

The $i_{q-ref}$ may be passed into a comparator, differentiator, or other mechanism to determine a difference between the $i_{q-ref}$ reference and a measured or calculated $i_q$ of motor 102. Similarly, an $i_{d-ref}$ may be passed into a comparator, differentiator, or other mechanism to determine a difference between the is-ref reference and a measured or calculated is of motor 102. The result of the comparisons may be passed into respective PI control operations. The result of the comparisons may be respective $V_d$ and $V_q$ values. These may represent the torque and flux component of voltages or duty cycle as expressed in DQ domain.

In one embodiment, $V_d$ and $V_q$ may be passed into a torque compensation 108 routine. Torque compensation 108 may be configured to otherwise provide dampening in system 100. Torque compensation 108 may include adders or other mechanisms to adjust respective values of $V_q$ and $V_d$ with respective reference values such as $V_{q\_Trq}$ and $V_{d\_Trq}$. These reference values, $V_{d\_Trq}$ and $V_{q\_Trq}$, are extra voltages or duty cycles to be added to the ones generated from current PI controllers. The purpose of this addition is to counteract and minimize the vibrations.

The result may be passed out into transformation routines to transform the data in the (d, q) domain to the (a, b, c) domain. Such routines may include intermediate transformations into the (a, (3) domain. Space vector modulation may be applied to yield the corresponding values of $V_a$, $V_b$, and $V_c$. These may be applied bridge 104. Bridge 104, using the control signals, may generate $i_a$, $i_b$, and $i_c$ current values to motor 102. These same $i_a$, $i_b$, and $i_c$ values may be input back into motor controller 106. Motor controller 106 may include further transformation routines to transform the data in the (a, b, c) domain into the (d, q) domain. Such routines may include intermediate transformations into the (α,β) domain. Resultant $i_q$ and $i_d$ values may be passed to the comparators.

Motor controller 106 may include position and velocity sensing and estimation routines 112. These may be used to sense or estimate the rotor position of motor 102. These may be fed back into routines for transformation between the (d, q) domain and the (a, b, c) domain. In one embodiment, the sensing or estimation of the rotor position of motor 102 may be fed to mechanical frequency removal routines 110. These may be configured to remove mechanical frequency from the frequency measurement. The speed, as measured from the operation of motor 102, may include an expected speed (also referred to as "dc") plus the ripple or mechanical frequency. This speed, as applied to a notch filter or second-order generalized integrator (SOGI), may yield the ripple or mechanical frequency. Furthermore, this speed, as applied to a high-pass, low-pass filter at mechanical frequency may yield the ripple or mechanical frequency. In addition, this speed, as applied to an averaging block, may yield the expected speed. Using these operations, the expected speed and ripple may be separated. For example, routines 112 may yield the combination of the expected speed and the ripple. Block 304, discussed in more detail below, may yield the ripple alone. Block 110 may yield the expected speed alone.

For feedback, only the constant, expected speed might be needed. Thus, block 110 may remove the ripple and yield the expected speed.

Mechanical frequency may arise, for example, during operation of the system in which motor 102 operates. For example, when motor 102 is configured to operate a compressor, the compressor may compress gas, pushes the gas out of a chamber, then forcibly intake a next sample of gas to be compressed. These steps may occur in a single mechanical rotation of motor 102. Whenever motor 102 is powering the compression during this rotation or cycle, a high torque load may exist on motor 102. Whenever motor 102 is intaking gas, a low torque load on motor 102 may exist. This is a cyclic load at a mechanical frequency, since this happens over one complete mechanical revolution of the rotor of motor 102. Since torque is pulsating, the torque may impact speed. Operation of motor 102 may be desired to be performed at a constant speed. However, because the opposing force is changing, this may lead to a variation in speed at the same mechanical frequency. Thus, this speed variation may be extracted and subtracted from the actual speed, thereby removing this mechanical frequency component of speed from the feedback. This may be accomplished, for example, in mechanical frequency routines 110.

Accordingly, during FOC, motor controller 106 may perform torque compensation with compensation routines 108. Embodiments of the present disclosure include torque compensation in compressors. The torque compensation may be implemented in analog circuitry, digital circuitry, instructions for execution by a processor stored in a machine-readable medium, or any suitable combination thereof. The embodiments may be implemented in, for example, a controller or firmware for a compressor motor.

Active torque compensation with inverters performed by embodiments of the present disclosure may improve reliability of the end products that use compressors, such as refrigerators or air conditioners. Furthermore, efficiency while operating at low speed may be improved. The controllers may reduce mechanical vibrations of the compressors particularly when operating at a low speed. The reduced mechanical vibration may allow the compressor to safely operate at a lower speed and thus successfully operate for longer durations at higher efficiency.

A non-inverter driven compressor works as On/Off device controlling room temperature in applications such as an air-conditioner or a refrigerator. However, an inverter driven compressor can be run at any speed. The inverter driven compressor may have to run for a long time at a low speed. The low speed may cause extra mechanical vibrations when compared to higher speeds because of torque. Higher vibrations may exist at low speed because the inertia of the compressor may attenuate its response to higher speed. These vibrations can cause problems such as cracks in pipes.

Figure 2A:
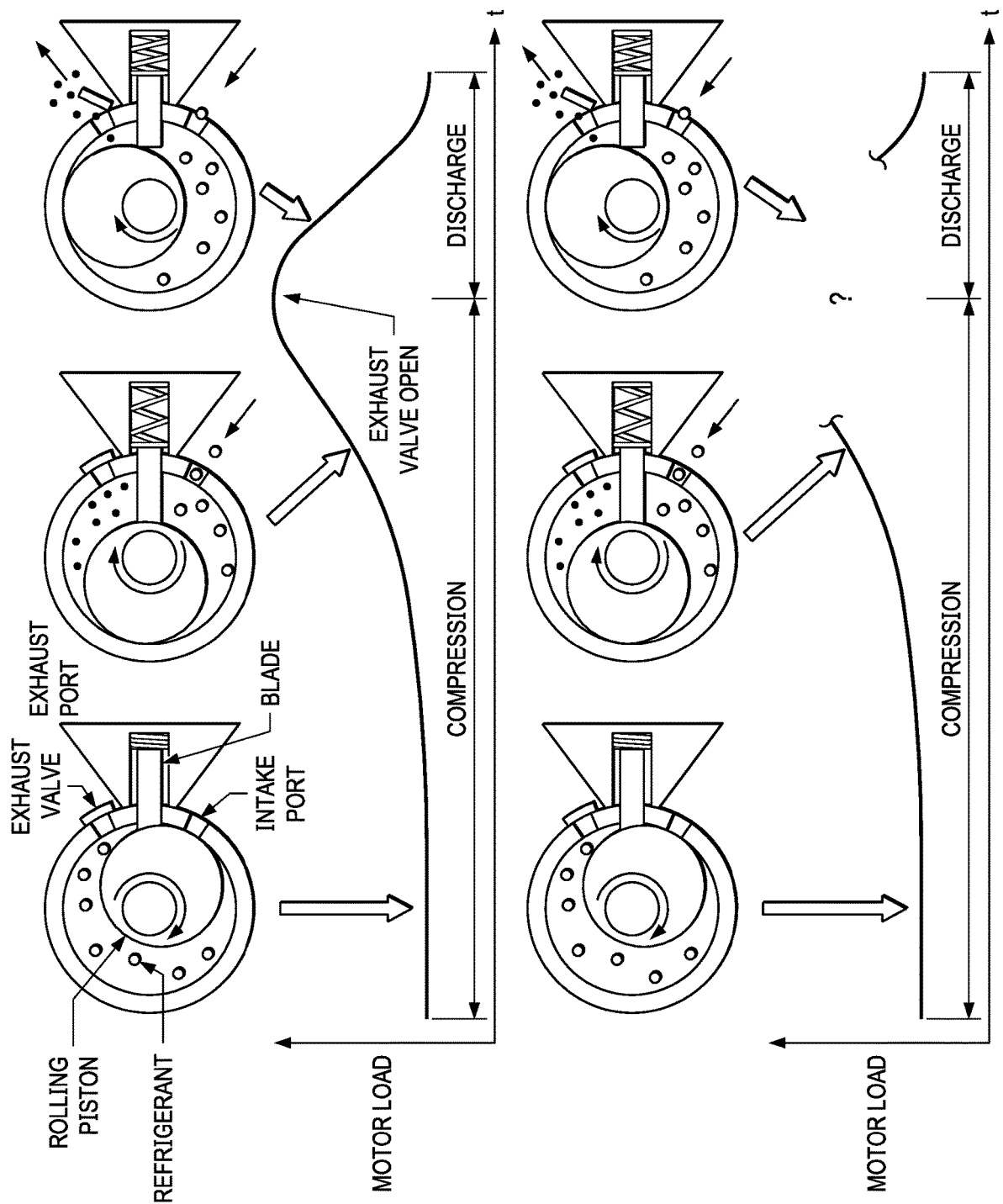
FIGS. 2A and 2B are illustrations of torque compensation used in other solutions.
Figure 2B:
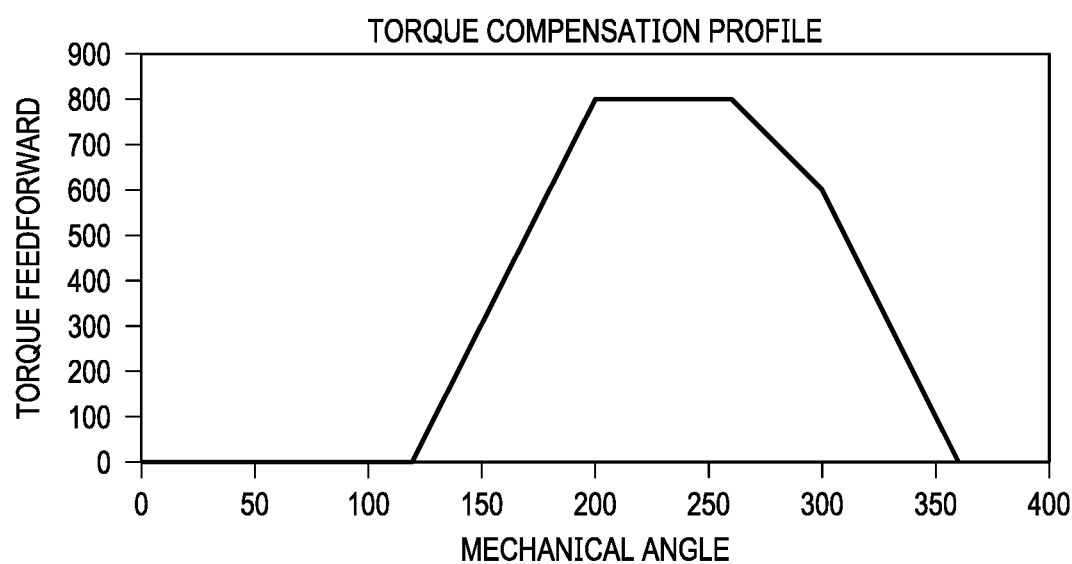

FIGS. 2A and 2B illustrate operation of other solutions of torque compensation. In other solutions, torque compensation may be performed wherein $V_{d\_Trq}$ is set to zero. $V_{q\_Trq}$ may be applied as a torque-mechanical angle curve if known, and a square wave with a 50% duty cycle if not known. These values may be stored in, for example, lookup tables.

This may cause several side-effects. The mechanical angle might not be known for multi-pole-pair motors. Look-up tables need to be available and be accurate for the particular motors involved. The magnitude of $V_{q\_Trq}$ in the square wave compensation needs tuning. Furthermore, the magnitude needs tuning for different loads and motors. When no look-up value is available and the square wave is used, an amplitude for the square wave must be chosen and this selection may be inaccurate.

Figure 3:
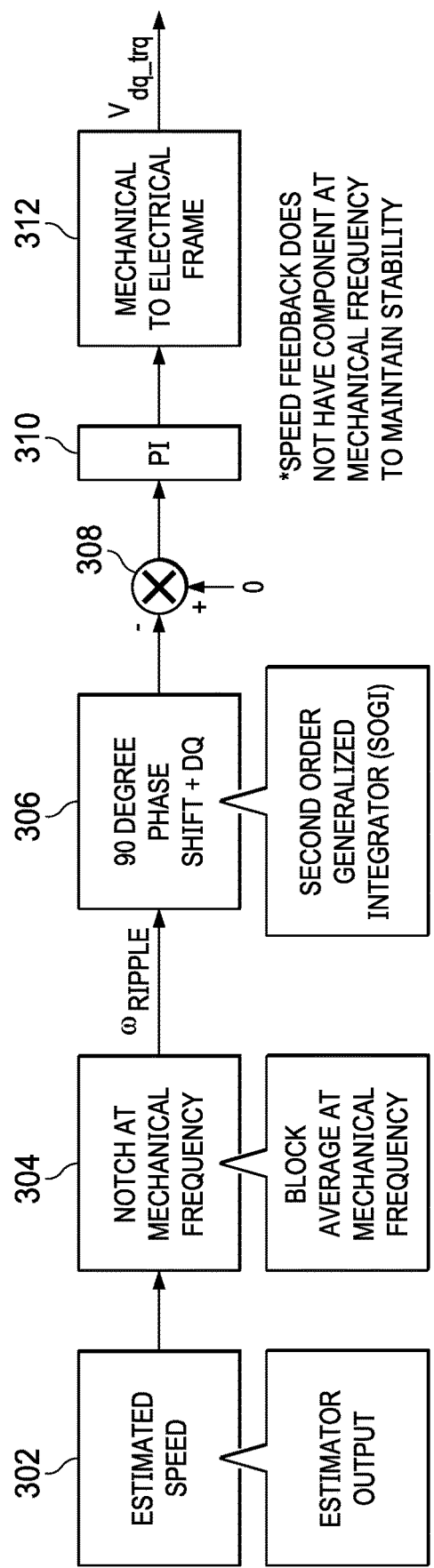
FIG. 3 is a block diagram of calculation of torque compensation, according to embodiments of the present disclosure.

FIG. 3 is a block diagram illustrating calculation of torque compensation, according to embodiments of the present disclosure. FIG. 3 illustrates example implementation of routines to calculate Vd_Trq and Vq_Trq to be used in routines 108 in FIG. 1. The torque compensation calculation may be closed-loop. Torque compensation may be performed to extract the ripple in an estimation of speed at a given mechanical frequency. A PI loop may be performed over the extracted ripple in the DQ domain. A ripple may include a periodic signal that is unexpected or unwanted. For a given speed, a constant or consistent signal may be expected. A time-varying, periodic signal interfering with such a constant signal may be referenced as a "ripple". A compressor or other mechanical device may generate an unexpected frequency component due to mechanical operation, the frequency component occurring at a mechanical frequency. The terms ripple and mechanical frequency component may be interchanged. As the speed may include a ripple in combination with the dc component, the speed may appear lie a sine wave with an offset. The offset may be the dc value and the sine wave's frequency may be the mechanical frequency, given by electrical frequency and pole pairs.

First, an estimated speed may be calculated in estimated speed routine 302. This may be performed by an estimator block. The estimation may come from, for example, routine 112 in FIG. 1. In some embodiments, a detected or sensed speed may be used.

Next, routine 304 may yield the ripple or mechanical frequency component of the speed. The block average may be calculated. A filter such as a notch filter, a high-low pass filter, a block average filter, or a second-order integrator may be used to find the ripple. The frequency of the ripple may be provided to a second-order integrator block 306. The notch of the notch filter may correspond to the frequency response of a utilized band-pass filter. The dc component may be filtered out and the ripple passed.

Figure 4:
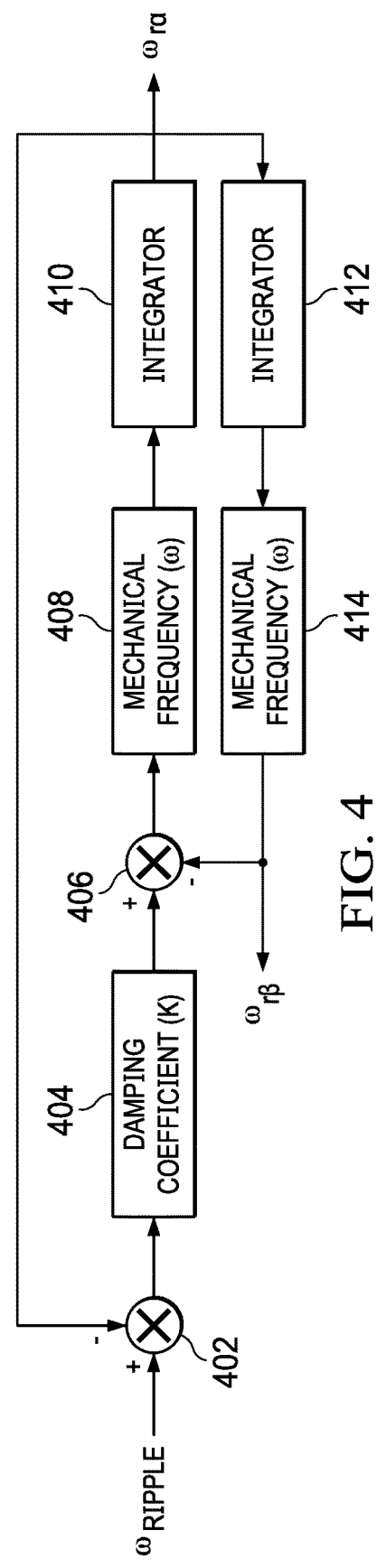
FIG. 4 is a more detailed view of a second-order integrator block for torque compensation, according to embodiments of the present disclosure.

Second-order integrator block 306 may perform a ninety degree phase shift plus DQ. More detailed operation of block 306 is illustrated in FIG. 4. In the shift block, one signal is fed into the shift block and two signals are received as an output—one in-phase with the input and the other shifted 90 degrees with respect to the input. These two signals may be taken through a Park Transformation to transform to DQ domain. The result may be negated in 308, and in 310 PI may then be performed. From the result, a mechanical to electric frame value may be obtained in block 312.

FIG. 4 is a more detailed view of the second-order integrator block 306 from FIG. 3, according to embodiments of the present disclosure.

At 404, the frequency of the ripple is input into the block. A difference between the input frequency of the ripple and a previously determined output is found. At 404, a dampening coefficient may be calculated or applied therefrom. At 406, a difference between a previously determined frequency is again calculated and the result fed into a mechanical frequency operation 408 and then into an integrator 410. The output of integrator 410 is the output frequency. The output is also fed into another integrator 412, then into another mechanical frequency operation 414, and back into the difference calculation at 406.

In the mechanical frequency operations 408, 414, the input may be multiplied by mechanical frequency. Mechanical frequency may be calculated as the electric frequency or the number of pole pairs. As the electric frequency changes, the mechanical frequency changes.

The output of integrator 410 may be denoted as $\omega_{r\alpha}$. The output of mechanical frequency calculation 414 may be denoted as $\omega_{r\beta}$. These outputs are speed expressed in the "alpha" and "beta" domain at mechanical frequency.

Torque compensation may be performed in two stages. The first stage may include eliminating the mechanical frequency component from speed feedback so as to generate a torque current reference. The second stage may include actively making the speed at mechanical frequency zero. Accordingly, taking an estimated or measured speed it may be passed through a second-order integration that gives the speed at mechanical frequency in alpha-beta domain. Then, the alpha-beta domain speed is taken through a Park Transformation block that converts it to DQ domain speed at mechanical frequency. This is now passed through PI to generate DQ domain voltage or duty cycle at mechanical frequency. As motor controller 106 may be in electrical frequency, the mechanical frequency may be transformed to electrical frequency. The $V_{d\_Trq}$ and $V_{q\_Trq}$ may help, along with feedback mechanical frequency elimination, that reduce the vibration.

Thus, torque compensation may be performed by first extracting a mechanical frequency component from the estimated speed. The mechanical frequency may then be transformed into the DQ domain at the mechanical frequency. The mechanical frequency may be controlled to be zero. Then, the DQ domain value for the mechanical frequency may be converted to the DQ domain at the electrical frequency. The quantities may be fed forward to the applied voltage. The quantities may be used to dampen or compensate for the torque. The applied voltage may be used to dampen or compensate for the torque.

In various embodiments, current may be used instead of voltage. For example, a current reference and applied current may be used in place of a voltage reference and applied voltage.

Figure 2B:
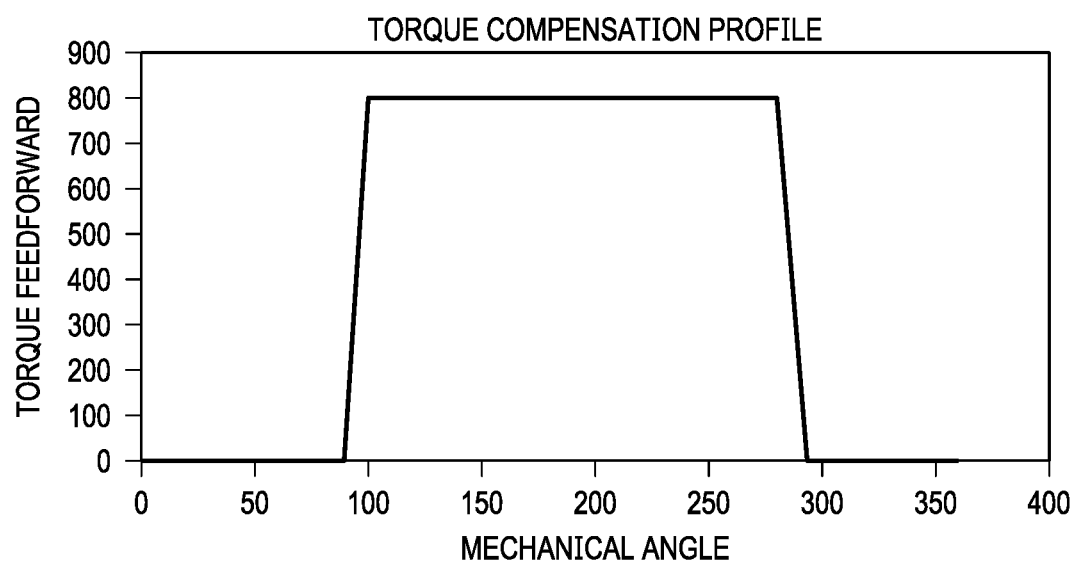

The closed loop torque compensation performed in FIGS. 3-4 need not use a torque-position graph for compensation, such as those in FIG. 2. Accordingly, embodiments of the present disclosure may be more readily applied to a variety of compressors and compressor motors, each of which may have different torque-position graphs. The embodiments are compatible with different motors and require minimal tuning.

Figure 6:
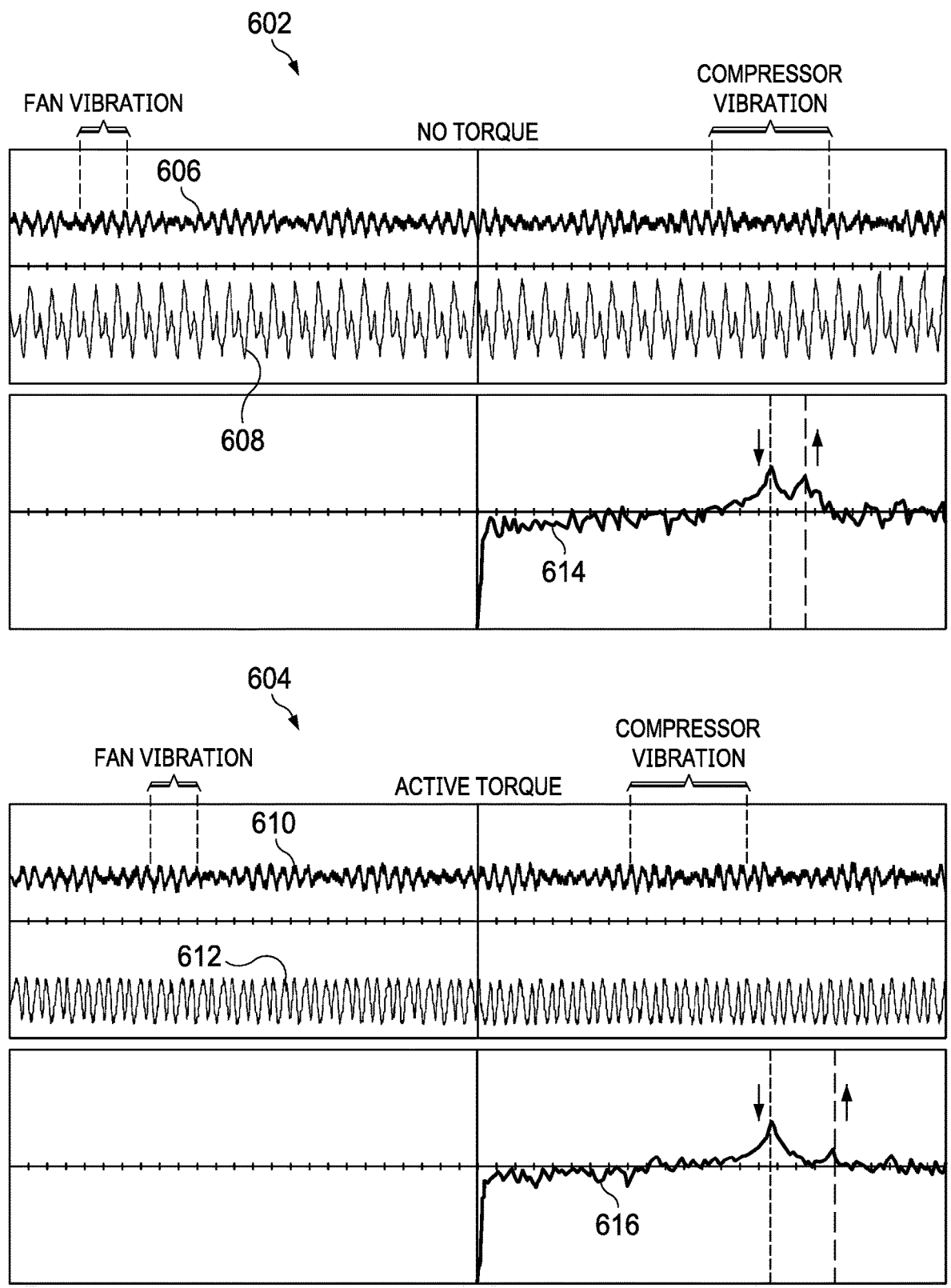

FIGS. 5 and 6 illustrate results of performance of embodiments of the present disclosure when compared to the same embodiments wherein active torque compensation is not performed. In FIG. 5, at various motor speeds, expressed in revolutions-per-minute, vibration measurements are shown. Such measurements are shown with and without the torque compensation as performed in FIGS. 1, 3, and 4. As shown, resonance may occur at higher speeds. Thus, in some embodiments the torque compensation algorithm might only be applied at a lower speed. At the resonance frequency, the torque compensation may have amplified the vibration rather than suppressing it. Thus, motor controller 106 may be configured to selectively shut off torque compensation above a speed threshold, within a speed range, or at a resonant frequency or resonant frequency range.

In FIG. 6, a graph of vibration analysis is presented. In the left set 602 of plots, analysis of vibration without torque compensation is presented. In the right set 604 of plots, analysis of vibration with torque compensation is presented. The analysis may be performed for 500 revolutions per minute.

Vibrations 606, 610 are illustrated for each case. In each of vibrations 606, 610, there are two frequencies present—one high frequency and an envelope at a lower frequency. The higher frequency vibrations may be due to fan vibration. The higher frequency due to fan vibration may arise from a fan that helps transfer heat to the outside atmosphere. The lower frequency envelopes may be due to mechanical vibration of the compressor. Motor controller 106 may be configured to address the lower frequency envelopes due to mechanical vibration of the compressor. Comparing sets 602, 604, the compressor vibration is significantly reduced in set 604.

Phase currents 608, 612 are also illustrated for each of the sets. Without torque compensation, phase current 608 experiences high harmonics. In contrast, phase current 612 with torque compensation experienced reduced harmonics.

FFTs 614, 616 are illustrated. Each of FFTs 614, 616 may be a respective FFT of vibrations 606, 610. Two peaks are present in in each of FFTs 614, 616. The first peak corresponds to fan vibration. The second peak corresponds to compressor vibration. As shown, fan peak remains the same while compressor peak has reduced due to torque compensation The present disclosure has been described in terms of one or more embodiments, and it should be appreciated that many equivalents, alternatives, variations, and modifications, aside from those expressly stated, are possible and within the scope of the disclosure. While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

We claim:

1. A motor controller, comprising:
   a processor; and
   a machine readable medium, the medium comprising instructions that, when loaded and executed by the processor, cause the processor to:
   receive an estimated or sensed speed of a motor;
   extract a mechanical frequency component from the estimated or sensed speed, the estimated or sensed speed including a combination of an expected speed and the mechanical frequency;
   transform the mechanical frequency component into direct quadrature (DQ) domain at the mechanical frequency to obtain a DQ domain value for the mechanical frequency;
   control the DQ domain value for the mechanical frequency to zero; and
   generate a dampening signal for torque based upon the controlled DQ domain value for the mechanical frequency.

2. The motor controller of claim 1, further including instructions for causing the processor to:
   generate the dampening signal by converting the controlled DQ domain value for the mechanical frequency at zero to DQ domain at an electrical frequency.

3. The motor controller of claim 2, further including instructions for causing the processor to feed forward the converted DQ domain value for the mechanical frequency at zero to DQ domain at an electrical frequency to a next iteration of control.

4. The motor controller of claim 1, further including instructions for causing the processor to feed the controlled DQ domain value for the mechanical frequency forward to a next iteration of control.

5. The motor controller of claim 1, further including instructions for causing the processor to extract the mechanical frequency component from the estimated or sensed speed by applying a notch filter.

6. The motor controller of claim 1, further including instructions for, upon feedback of speed and position of the motor, removing the mechanical frequency component from the speed and position of the motor for a next execution of motor control.

7. The motor controller of claim 1, further including instructions for causing the processor to calculate the compensation by performing a proportional-integrative (PI) loop over an extracted ripple in DQ domain.

8. The motor controller of claim 1, wherein the expected speed and the mechanical frequency are separate measurements.

9. The motor controller of claim 1, further including instructions for causing the processor to:
separate the expected speed component and the mechanical frequency component;
route the expected speed component for feedback comparison against a speed reference; and
route the mechanical frequency component to transform the mechanical frequency into the DQ domain at a mechanical frequency of the mechanical frequency component.

10. An article of manufacture, comprising a machine-readable medium, the medium including instructions that, when loaded and executed by a processor, cause the processor to:
receive an estimated or sensed speed of a motor;
extract a mechanical frequency component from the estimated or sensed speed, the estimated or sensed speed including an expected speed and the mechanical frequency;
transform the mechanical frequency component into direct quadrature (DQ) domain at the mechanical frequency to obtain a DQ domain value for the mechanical frequency;
control the DQ domain value for the mechanical frequency to zero; and
generate a dampening signal for torque based upon the controlled DQ domain value for the mechanical frequency.

11. The article of claim 10, further including instructions for causing the processor to:
generate the dampening signal by converting the controlled DQ domain value for the mechanical frequency at zero to DQ domain at an electrical frequency.

12. The article of claim 11, further including instructions for causing the processor to feed forward the converted DQ domain value for the mechanical frequency at zero to DQ domain at an electrical frequency to a next iteration of control.

13. The article of claim 10, further including instructions for causing the processor to feed the controlled DQ domain value for the mechanical frequency forward to a next iteration of control.

14. The article of claim 10, further including instructions for causing the processor to extract the mechanical frequency component from the estimated or sensed speed by applying a notch filter.

15. The article of claim 10, further including further including instructions for, upon feedback of speed and position of the motor, removing the mechanical frequency component from the speed and position of the motor for a next execution of motor control.

16. The article of claim 10, further including instructions for causing the processor to calculate the compensation by performing a proportional-integrative (PI) loop over an extracted ripple in DQ domain.

17. A method for compensation of torque in a motor, comprising:
receiving an estimated or sensed speed of the motor;
extracting a mechanical frequency component from the estimated or sensed speed, the estimated or sensed speed including an expected speed and the mechanical frequency;
transforming the mechanical frequency component into direct quadrature (DQ) domain at the mechanical frequency to obtain a DQ domain value for the mechanical frequency;
controlling the DQ domain value for the mechanical frequency to zero; and
generating a dampening signal for torque based upon the controlled DQ domain value for the mechanical frequency.

18. The method of claim 17, further including generating the dampening signal by converting the controlled DQ domain value for the mechanical frequency at zero to DQ domain at an electrical frequency.

19. The method of claim 18, further including feeding forward the converted DQ domain value for the mechanical frequency at zero to DQ domain at an electrical frequency to a next iteration of control.

20. The method of claim 17, further including feeding the controlled DQ domain value for the mechanical frequency forward to a next iteration of control.

21. The method of claim 17, further including extracting the mechanical frequency component from the estimated or sensed speed by applying a notch filter.

22. The method of claim 17, further including, upon feedback of speed and position of the motor, removing the mechanical frequency component from the speed and position of the motor for a next execution of motor control.

* * * * *